(12) United States Patent
Um et al.

(10) Patent No.: US 8,675,040 B2
(45) Date of Patent: Mar. 18, 2014

(54) METHOD AND DEVICE FOR ADJUSTING DEPTH PERCEPTION, TERMINAL INCLUDING FUNCTION FOR ADJUSTING DEPTH PERCEPTION AND METHOD FOR OPERATING THE TERMINAL

(75) Inventors: Gi-Mun Um, Daejeon-si (KR); Gun Bang, Daejeon-si (KR); Tae One Kim, Daejeon-si (KR); Eun Young Chang, Daejeon-si (KR); Hong Chang Shin, Seoul (KR); Nam Ho Hur, Daejeon-si (KR); Soo In Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 274 days.

(21) Appl. No.: 13/313,612

(22) Filed: Dec. 7, 2011

(65) Prior Publication Data
US 2012/0154517 A1    Jun. 21, 2012

(30) Foreign Application Priority Data

Dec. 21, 2010    (KR) .................. 10-2010-0131099

(51) Int. Cl.
*H04N 13/02*    (2006.01)
(52) U.S. Cl.
CPC ................... *H04N 13/02* (2013.01)
USPC .......... 348/14.16; 348/14.01; 348/14.08

(58) Field of Classification Search
USPC ............... 348/14.01–14.16, 46, 51
See application file for complete search history.

(56) References Cited

U.S. PATENT DOCUMENTS

| | | | |
|---|---|---|---|
| 2006/0192847 A1* | 8/2006 | Watanabe | 348/14.07 |
| 2011/0316984 A1* | 12/2011 | Akeley et al. | 348/51 |
| 2012/0120195 A1* | 5/2012 | Shows et al. | 348/46 |

FOREIGN PATENT DOCUMENTS

| | | |
|---|---|---|
| KR | 1020060030208 | 4/2006 |
| WO | 2008/016882 A2 | 2/2008 |

* cited by examiner

*Primary Examiner* — Melur Ramakrishnaiah
(74) *Attorney, Agent, or Firm* — Nelson Mullins Riley & Scarborough LLP

(57) ABSTRACT

A method and a device for adjusting depth perception, a terminal including a function for adjusting depth perception and a method for operating the terminal are provided. The method for adjusting depth perception includes: obtaining color and depth videos of a user; detecting a user's position based on the obtained depth video of the user; calculating a range of maximum and minimum depths in a 3-dimensional (3D) video according to the detected user's position; and adjusting a left and right stereo video generating interval of the 3D video to be rendered so as to satisfy the calculated range of the maximum and minimum depths. Therefore, during a 3D or multi-view video call, the 3D video having a three-dimensional effect optimized according to the user's position may be provided.

18 Claims, 4 Drawing Sheets

METHOD AND DEVICE FOR ADJUSTING DEPTH PERCEPTION, TERMINAL INCLUDING FUNCTION FOR ADJUSTING DEPTH PERCEPTION AND METHOD FOR OPERATING THE TERMINAL

CROSS-REFERENCE TO RELATED APPLICATIONS

This application claims the benefit of priority of Korean Patent Application No. 10-2010-0131099 filed on Dec. 21, 2010, which is incorporated by reference in their entirety herein.

BACKGROUND OF THE INVENTION

1. Field of the Invention

The present invention relates to a method and a device for adjusting depth perception, a terminal including a function for adjusting depth perception and a method for operating the terminal, and more particularly, to a technology capable of displaying an optimal 3-dimensional (3D) stereoscopic video by detecting a position of a user using a terminal when a service such as a video call, etc., is provided and adjusting depth perception of a rendered 3D video based on the detected user's position.

2. Related Art

Recently, a service applying a 3 dimensional (3D) display to a video call using a portable terminal such as a mobile phone has been attempted. The 3D display basically means a display scheme in which 2 dimensional video signals of two or more viewpoints having a time difference are simultaneously provided to each of both eyes of a person, such that the person may feel a three-dimensional effect.

In order to perform the 3D display, a portable terminal according to the related art includes a both-eyes type camera capable of photographing a 3D stereoscopic video and devices capable of processing and displaying the 3D stereoscopic video. Generally, the portable terminal supporting a 3D video call may display left and right videos obtained from a plurality of cameras and transmit the left and right videos to a remote portable terminal through a transmission network such as a digital multimedia broadcasting (DMB) network, etc. Here, when the remote portable terminal includes a 3D display function, it may display the 3D video, and when the remote portable terminal does not include the 3D display function, it may display a 2D video.

However, the 3D video provided by obtaining the left and right videos generally has a significantly large amount of data, such that it may impose a significant burden on the transmission network in a service system based on real time transmission such as the 3D video call, etc. In addition, the 3D video provided by obtaining the left and right videos has a three-dimensional effect represented regardless of a position of a user viewing the 3D video, a size or a resolution of a display, or the like, thereby having a difficulty in providing a good quality stereoscopic video to the user.

SUMMARY OF THE INVENTION

The present invention provides a method and a device for adjusting depth perception capable of displaying an optimal 3-dimensional (3D) video to a user during a video call by detecting a user's position based on a depth sensor and adjusting depth perception of a rendered 3D video according to the detected user's position.

The present invention also provides a terminal including a function for adjusting depth perception capable of performing an optimal video call by obtaining information on a color and a depth of the user using a depth sensor and applying the above-mentioned method and device for adjusting depth perception based on the obtained information, and a method for operating the terminal.

In an aspect, a method for adjusting depth perception is provided. The method includes: obtaining color and depth videos of a user; detecting a user's position based on the obtained depth video of the user; calculating a range of maximum and minimum depths in a 3-dimensional (3D) video according to the detected user's position; and adjusting a left and right stereo video generating interval of the 3D video to be rendered so as to satisfy the calculated range of the maximum and minimum depths.

The method may further include scaling a depth video of the 3D video according to user input. The scaling of the depth video of the 3D video may include: receiving a request signal requesting scaling of the depth video from the outside; providing a user interface for the scaling the depth video of the 3D video in response to the request signal; and decreasing or increasing a current range of the maximum and minimum depths in the 3D video according to an adjusting signal input through the user interface.

The method may further include post-processing the obtained depth video of the user. In this case, the detecting of the user's position may include detecting the user's position based on the post-processed depth video.

In another aspect, a device for adjusting depth perception is provided. The device includes: a color and depth video obtaining unit obtaining color and depth videos of a user; a user's position detecting unit detecting a user's position based on the obtained depth video of the user; and a depth perception adjusting unit calculating a range of maximum and minimum depths in a 3D video according to the detected user's position and adjusting a left and right stereo video generating interval of the 3D video to be rendered so as to satisfy the calculated range of the maximum and minimum depths.

The depth perception adjusting unit may scale a depth video of the 3D video according to user input. The depth perception adjusting unit may provide a user interface for scaling the depth video of the 3D video in response to a request signal requesting scaling of the depth video when the request signal is received from the outside, and may decrease or increase a current range of the maximum and minimum depths in the 3D video according to an adjusting signal input through the user interface.

The device may further include a depth video post-processing unit post-processing the obtained depth video of the user. The user's position detecting unit may detect the user's position based on the post-processed depth video.

In another aspect, a terminal including a function for adjusting depth perception, the terminal is provided. The terminal includes: a color and depth video obtaining unit obtaining color and depth videos of a user; a receiving and de-multiplexing unit receiving and de-multiplexing color and depth videos transmitted from the outside; a decoding unit decoding the de-multiplexed color and depth videos; a user's position detecting unit detecting a user's position based on the obtained depth video of the user; a depth perception adjusting unit calculating a range of maximum and minimum depths in a 3D video according to the detected user's position and adjusting a left and right stereo video generating interval of the 3D video to be rendered so as to satisfy the calculated range of the maximum and minimum depths, and a rendering unit receiving the decoded color and depth videos and rendering the 3D video adjusted according to the left and right stereo video generating interval.

The terminal may further include a depth video post-processing unit post-processing the obtained depth video of the user, a coding unit coding the color and depth videos of the user obtained by the color and depth video obtaining unit; and a multiplexing and transmitting unit multiplexing and transmitting the coded color and depth videos.

In another aspect, a method for operating a terminal including a function for adjusting depth perception is provided. The method includes: obtaining color and depth videos of a user; receiving and de-multiplexing color and depth videos transmitted from the outside; decoding the de-multiplexed color and depth videos; detecting a user's position based on the obtained depth video of the user; calculating a range of maximum and minimum depths in a 3D video according to the detected user's position; adjusting a left and right stereo video generating interval of the 3D video to be rendered so as to satisfy the calculated range of the maximum and minimum depths; and receiving the decoded color and depth videos and rendering the 3D video adjusted according to the left and right stereo video generating interval.

The method may further include post-processing the obtained depth video of the user, coding the color and depth videos of the user obtained by the color and depth video obtaining unit, and multiplexing and transmitting the coded color and depth videos.

DESCRIPTION OF EXEMPLARY EMBODIMENTS

Hereinafter, exemplary embodiments of the present invention will be described in detail with reference to the accompanying drawings so that technical content of the present invention can be easily understood by those skilled in the art to which the present invention pertains. In the exemplary embodiments of the present invention described below, specific technical terminologies are used for clarity of content. However, the present invention is not limited to the selected specific terminologies. It should be understood that each of the specific terminologies includes all technical synonyms having similar meaning for accomplishing a similar object.

Figure 1:
FIG. 1 is a diagram illustratively showing an environment to which a method for adjusting depth perception according to an exemplary embodiment of the present invention may be applied.

FIG. 1 illustratively shows an environment to which a method for adjusting depth perception according to an exemplary embodiment of the present invention may be applied.

As shown in FIG. 1, a method for adjusting depth perception according to an exemplary embodiment of the present invention may be applied to a 3D video call, etc., using portable terminals 100 and 200, etc. For example, the portable terminal 100 of a user may perform the 3D video call with the portable terminal 200 of the other party through a communication network. Here, the portable terminal 100 may detect a relative position between the user and the portable terminal 100, that is, a user's position, and render a 3-dimensional (3D) video, while adjusting depth perception of a 3D video received from the other party according to the detected user's position.

Meanwhile, while the present exemplary embodiment has described an example in which the method for adjusting depth perception according to an exemplary embodiment of the present invention is applied to the 3D video call using the portable terminals, the method for adjusting depth perception according to an exemplary embodiment of the present invention may be variously applied to systems, for example, a 3D-TV, a mobile multi-viewpoint 3D video, etc., transmitting and receiving stereoscopic videos between terminals through a wired or wireless network as well as the 3D video call using the portable terminals.

Figure 2:
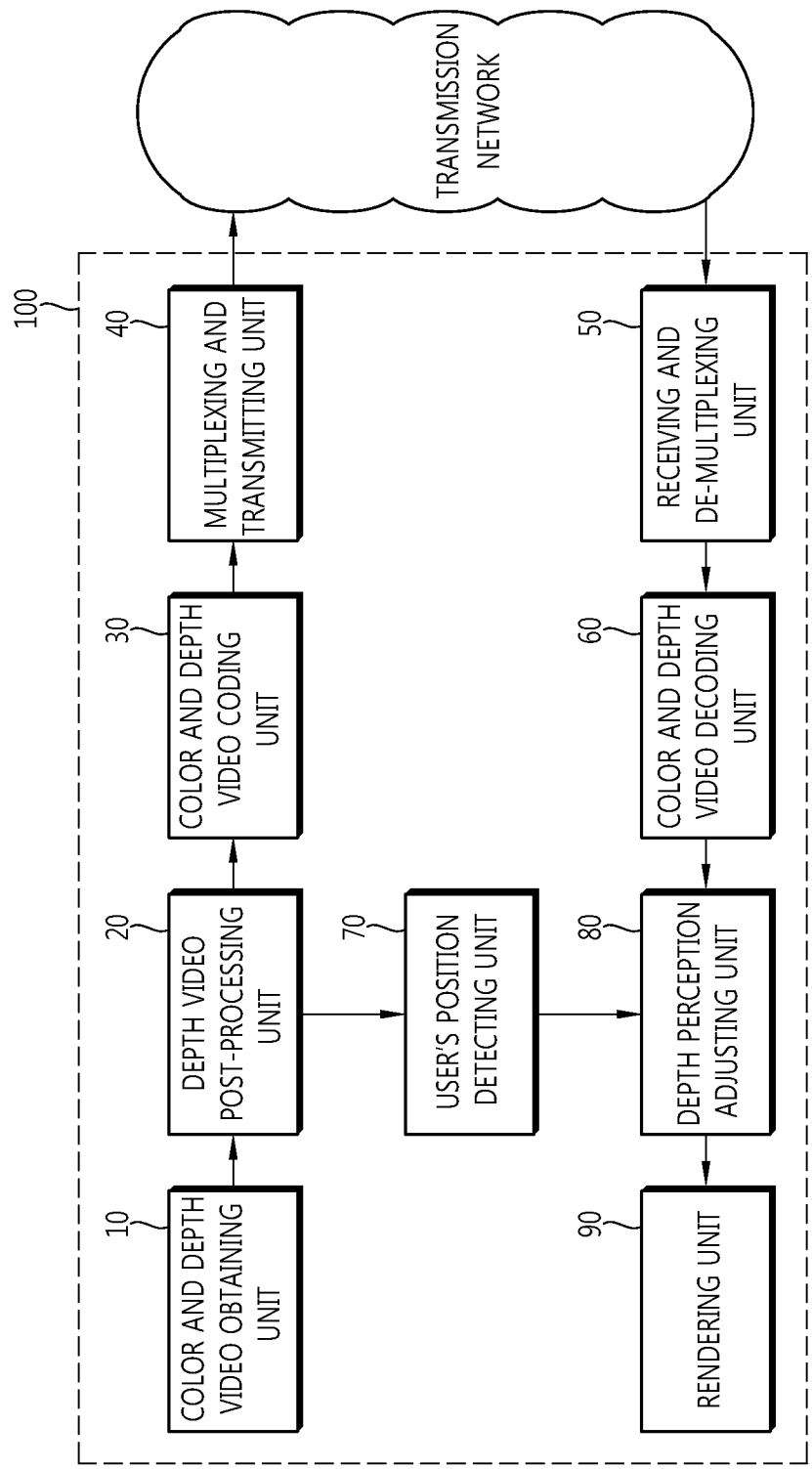
FIG. 2 is a block diagram showing a configuration of a portable terminal for implementing a method for adjusting depth perception according to an exemplary embodiment of the present invention.

FIG. 2 is a block diagram showing a configuration of a portable terminal 100 for implementing a method for adjusting depth perception according to an exemplary embodiment of the present invention.

As shown in FIG. 2, the portable terminal 100 may include a color and depth video obtaining unit 10, a depth video post-processing unit 20, a color and depth video coding unit 30, a multiplexing and transmitting unit 40, a receiving and de-multiplexing unit 50, a color and depth video decoding unit 60, a user's position detecting unit 70, a depth perception adjusting unit 80, and a rendering unit 90, and the like.

The color and depth video obtaining unit 10 may include a device capable of obtaining color and depth videos in real time, for example, a camera, a depth sensor, and the like. The color and depth video obtaining unit 10 may serve to obtain color and depth videos of a user photographed and sensed through the camera and the depth sensor.

The depth video post-processing unit 20 may serve to perform post-processing such as noise removal for each frame, etc., on the depth video obtained by the color and depth video obtaining unit 10. On the one hand, the post-processed depth video output from the depth video post-processing unit 20 may be transferred to the user's position detecting unit 70, and may also be transferred together with the color video to the color and depth video coding unit 30.

The color and depth video coding unit 30 may serve to code the depth video and the color video output from the depth video post-processing unit 20 according to a defined specification of format. For example, the color and depth video coding unit 30 may compress the color video and the depth video according to a specific specification of compression format, for example, moving picture experts group (MPEG)-2, MPEG-4 AVC (H.264), etc.

The multiplexing and transmitting unit 40 may serve to multiplex the color and depth videos coded by the color and depth video coding unit 30 and then, transmit them to the portable terminal 200 of the other party. In this case, the portable terminal 200 of the other party may receive the color and depth videos.

Meanwhile, the portable terminal 200 of the other party transmits a color video and a depth video of the other party, which may be received by the receiving and de-multiplexing unit 50. The receiving and de-multiplexing unit 50 may serve to de-multiplex the received color and depth videos of the other party and transmit them to the color and depth video decoding unit 60.

The color and depth video decoding unit 60 may serve to decode the color and depth videos de-multiplexed by the receiving and de-multiplexing unit. The color and depth videos decoded by the color and depth video decoding unit 60 has depth perception adjusted by the depth perception adjusting unit 80 so that the user may view an optimal 3D video, before being rendered into the 3D video by the rendering unit 90.

The user's position detecting unit 70 may serve to receive the depth video output from the depth video post-processing unit 20 and detect the user's position based on the received depth video. Here, the user's position means information on how far the user is distant from a screen of the portable terminal 100, for example, a viewing distance. The user's position detecting unit 70 may include a detecting algorithm capable of detecting the user's position from the depth video when the depth video is input thereto. For example, the user's position detecting unit 70 may inspect a depth perception histogram to determine an average of the depth values having the highest frequency number as a current viewing distance of the user.

The depth perception adjusting unit 80 may serve to calculate a range of maximum/minimum depths in the 3D video according to the user's position detected by the user's position detecting unit 70. Here, the range of the maximum/minimum depths means a range from the maximum depth to the minimum depth of the 3D video capable of being displayed at the user's position, that is, the viewing distance.

The depth perception adjusting unit 80 may determine the maximum and minimum depths of the 3D video capable of being displayed from the screen to the viewing distance when the user's position is provided, and calculate the range of the maximum/minimum depths based on the determined maximum and minimum depths. That is, the depth perception adjusting unit 80 calculates the range of the maximum/minimum depth in which an optimized three-dimensional effect may be felt at a position having minimum crosstalk, while minimizing crosstalk according to the user's position.

The maximum and minimum depths may be calculated by multiplying a left and right video generating interval (that is, a virtual camera interval) by a cameral focal length and dividing the multiplied value by each of the minimum and maximum disparities between the left and right videos.

When the range of the maximum/minimum depths is calculated, the depth perception adjusting unit 80 may serve to adjust a left and right stereo video generating interval of a 3D video to be rendered so as to satisfy the calculated range of the maximum/minimum depths.

Meanwhile, when the user feels that the 3D video optimized by adjusting the left and right stereo video generating interval is insufficient, the depth perception adjusting unit 80 may also provide a function of scaling the depth video according to the request of the user. This is the reason that the three-dimensional effect may be changed according to a size and a resolution of a 3D display panel performing the display. For example, in the case in which the display has a large size, an excessive three-dimensional effect is provided, such that the 3D video may be viewed as two videos or fatigue may be caused. On the other hand, in a terminal having a low resolution and a small size such as the portable terminal, the three-dimensional effect becomes very low, such that the 3D video may seem to be a 2D video.

To this end, the depth perception adjusting unit 80 may provide a user interface capable of adjusting scaling of the depth video, while viewing the 3D screen or according to a predetermined menu, when the user request requests scaling of the depth video. That is, the depth perception adjusting unit 80 performs scaling of the depth video according to user input.

In this case, the depth perception adjusting unit 80 may receive a request signal requesting scaling of the depth video from the user and provide the user interface capable of adjusting the scaling of the depth video of the 3D video in response to the request signal. In addition, the depth perception adjusting unit 80 may decrease or increase a current range of the maximum/minimum depths in the 3D video according to an adjusting signal input through the user interface.

The rendering unit 90 may receive the color and depth videos output from the color and depth video decoding unit 60, and generate and render the 3D video according to the left and right stereo video generating interval adjusted by the depth perception adjusting unit 80 or scaling of the depth video by user request. The 3D video optimized according to the user's position and output from the rendering unit 90 may be displayed through the display screen.

Figure 3:
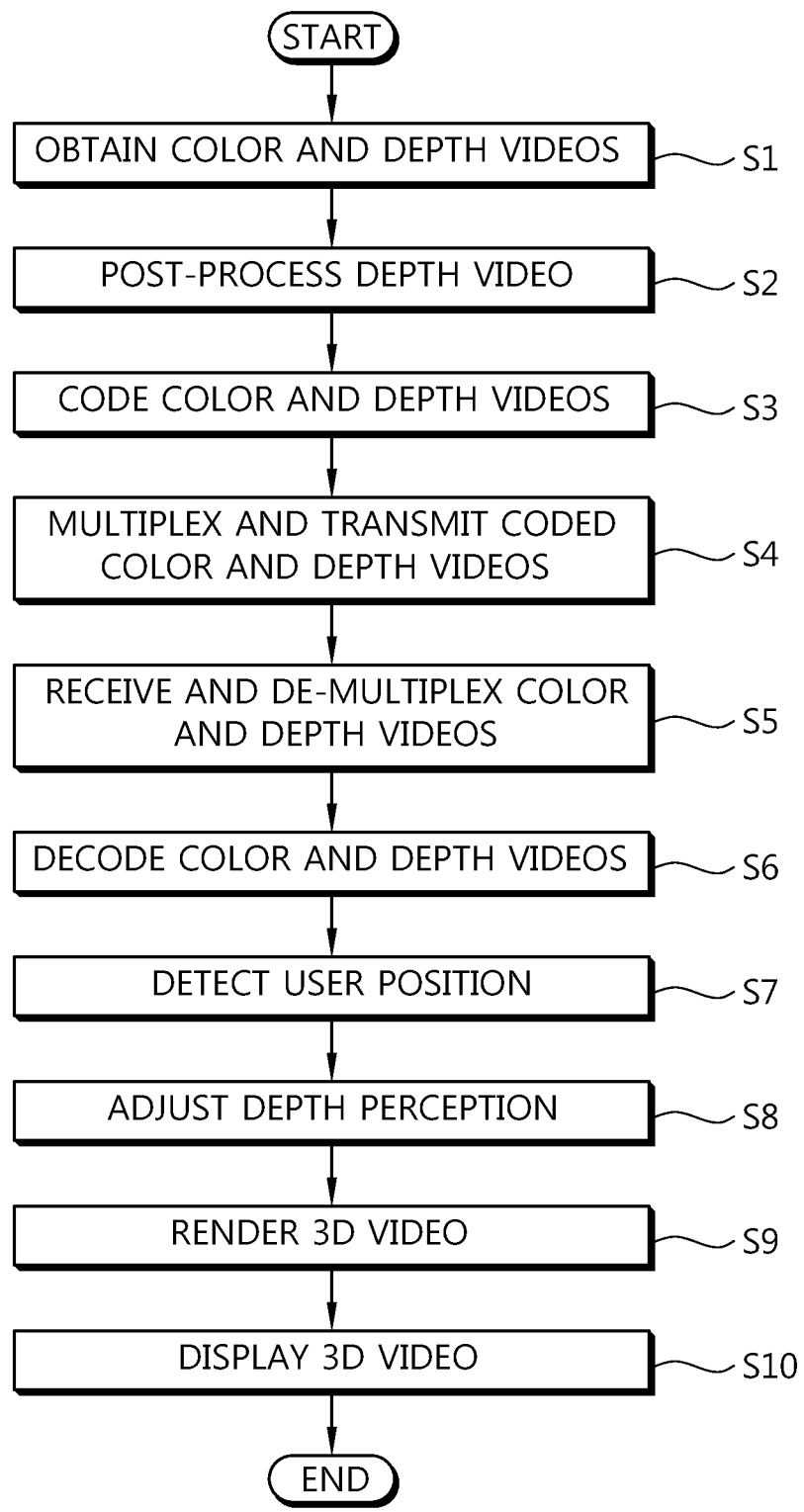
FIG. 3 is a flowchart describing an operational flow of a portable terminal to which a method for adjusting depth perception according to an exemplary embodiment of the present invention is applied.

FIG. 3 is a flowchart describing an operational flow of a portable terminal 100 to which a method for adjusting depth perception according to an exemplary embodiment of the present invention is applied.

It is assumed in the description with reference to FIG. 3 that the user performs the 3D video call with the user of the portable terminal 200 of the other party positioned at a remote place, while viewing the portable terminal 100.

As shown in FIG. 3, first, the color and depth video obtaining unit 10 of the portable terminal 100 may obtain the color and depth videos of the user in real time using the camera and the depth sensor included therein (S1).

Then, the depth video post-processing 20 of the portable terminal 100 may post-process the obtained depth video (S2). For example, the depth video post-processing unit may perform noise removal for each frame, etc., on the obtained depth video. The post-processed depth video may be coded together with the color video (S3). On the other hand, the post-processed depth video may be used for a user's position detection operation S7.

The multiplexing and transmitting unit 40 of the portable terminal 100 may multiplex the coded color and depth videos and then, transmit them to the portable terminal 200 of the other party (S4). In this case, the portable terminal 200 of the other party may receive the color and depth videos transmitted from the portable terminal 100.

Meanwhile, the portable terminal 200 of the other party may transmit the color and depth videos of the user of the other party to the portable terminal 100. The receiving and de-multiplexing unit 50 of the portable terminal 100 may receive the color and depth videos transmitted through the communication network and then, de-multiplex them (S5). Next, the color and depth video decoding unit 60 of the portable terminal 100 may decode the de-multiplexed color and depth videos (S6).

Meanwhile, the user's position detecting unit 70 of the portable terminal 100 may detect the user's position using the previously obtained and post-processed depth video of the user (S7). When the user's position is detected, the depth perception adjusting unit 80 may adjust the depth perception of the 3D video to be rendered based on the detected user's position (S8). A detailed flow of the process of detecting the user's position and adjusting the depth perception is shown in FIG. 4.

Figure 4:
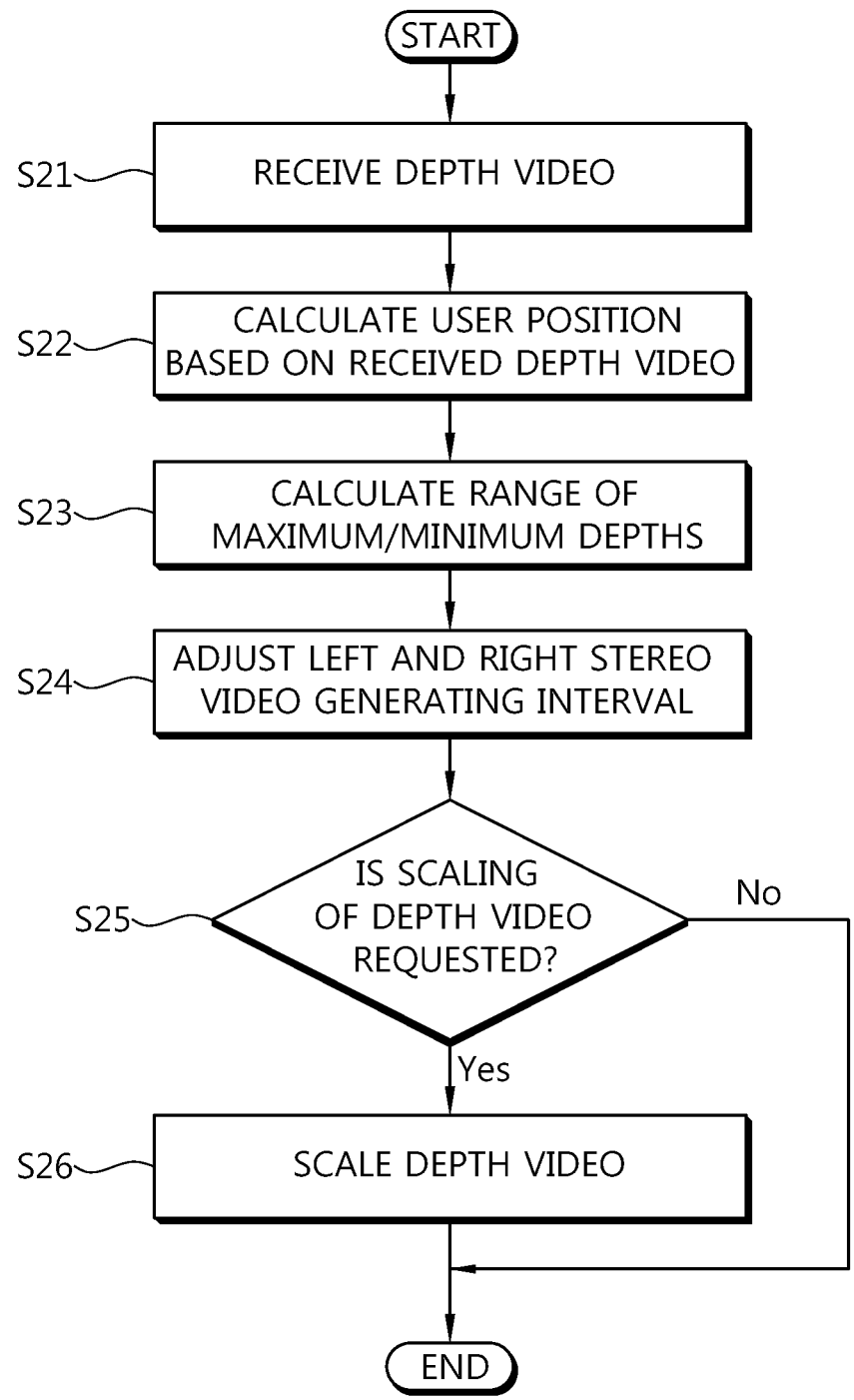
FIG. 4 is a flowchart showing a process of detecting a user's position and adjusting depth perception of a 3D video based on the detected user's position in a portable terminal.

FIG. 4 is a flowchart showing a process of detecting a user's position and adjusting depth perception of a 3D video based on the detected user's position in a portable terminal 100.

As shown in FIG. 4, the user's position detecting unit 70 of the portable terminal 100 may receive the depth video of the user post-processed by the depth video post-processing unit 20 (S21), and detect the user's position, that is, the viewing distance based on the received depth video of the user (S22). For example, the user's position detecting unit 70 may include the detecting algorithm detecting the user's position from the depth video and detect the user's position through the detecting algorithm.

When the user's position is detected, the depth perception adjusting unit 80 may calculate the range of the maximum/minimum depths based on the detected user's position (S23). For example, the depth perception adjusting unit 80 may find the maximum and minimum depths of the 3D video capable of being displayed at the user's position and calculate the range from the maximum depth to the minimum depth. That is, the depth perception adjusting unit 80 calculates the range of the maximum/minimum depths providing the three-dimensional effect optimized at the user's position.

When the range of the maximum/minimum depths is calculated, the depth perception adjusting unit 80 of the portable terminal 100 may adjust the left and right stereo video generating interval of the 3D video to be rendered so as to satisfy the calculated range of the maximum/minimum depths (S24).

The rendering unit 90 of the portable terminal receives the decoded color and depth videos, and renders the 3D video having the left and right stereo video generating interval adjusted by the depth perception adjusting unit 80 (S9). Then, the optimized 3D stereoscopic video is displayed on the display screen of the portable terminal 100 (S10).

Meanwhile, the user may want to additionally adjust the three-dimensional effect in the 3D video displayed on the screen of the portable terminal 100. In this case, the 3D video may be adjusted to have an easily viewed three-dimensional effect through the user interface provided by the depth perception adjusting unit 80.

In this case, the depth perception adjusting unit 80 may receive the request signal (for example, specific key input, icon click, or the like) requesting scaling of the depth video from the user (S25). The depth perception adjusting unit 80 may provide user interface capable of adjusting scaling of the depth video of the 3D video in response to the request signal and scale the depth video according to the adjusting signal input through the user interface (S26).

As described above, according to the exemplary embodiments of the present invention, during the 3D or multi-viewpoint video call, the 3D video having the three-dimensional effect optimized according to the user's position may be provided, and a satisfactory 3D stereoscopic screen may be provided by scaling the depth video according to the intention of the user.

As described above, according to the exemplary embodiments of the present invention, during the stereo 3D or multi-viewpoint 3D video call, a 3D video having the three-dimensional effect optimized according to the user's position may be provided, while significantly reducing transmission data amount by using a scheme of obtaining and transmitting color and depth videos, as compared to a scheme of obtaining and transmitting the left and right stereo videos according to the related art, and a satisfactory 3D stereoscopic screen may be provided by scaling the depth video according to the intention of the user.

Although the exemplary embodiments of the present invention have been described, it may be appreciated by those skilled in the art that various modifications and change can be made without departing from the spirit and scope of the appended claims of the present invention. Therefore, the future change in the embodiments of the present invention cannot depart from the technology of the present invention.

What is claimed is:

1. A method for adjusting depth perception, the method comprising:
    obtaining color and depth videos of a user;
    detecting a user's position based on the obtained depth video of the user;
    calculating a range of maximum and minimum depths in a 3-dimensional (3D) video according to the detected user's position; and
    adjusting a left and right stereo video generating interval of the 3D video to be rendered so as to satisfy the calculated range of the maximum and minimum depths.

2. The method of claim 1, further comprising scaling a depth video of the 3D video according to user input.

3. The method of claim 2, wherein the scaling of the depth video of the 3D video includes:
    receiving a request signal requesting scaling of the depth video from the outside;
    providing a user interface for the scaling of the depth video of the 3D video in response to the request signal; and
    decreasing or increasing a current range of the maximum and minimum depths in the 3D video according to an adjusting signal input through the user interface.

4. The method of claim 1, further comprising post-processing the obtained depth video of the user,
    wherein the detecting of the user's position includes detecting the user's position based on the post-processed depth video.

5. A device for adjusting depth perception, the device comprising:
    a color and depth video obtaining unit obtaining color and depth videos of a user;
    a user's position detecting unit detecting a user's position based on the obtained depth video of the user; and
    a depth perception adjusting unit calculating a range of maximum and minimum depths in a 3D video according to the detected user's position and adjusting a left and right stereo video generating interval of the 3D video to be rendered so as to satisfy the calculated range of the maximum and minimum depths.

6. The device of claim 5, wherein the depth perception adjusting unit scales a depth video of the 3D video according to user input.

7. The device of claim 6, wherein the depth perception adjusting unit provides a user interface for scaling the depth video of the 3D video in response to a request signal requesting the scaling of the depth video when the request signal is received from the outside, and decreases or increases a current range of the maximum and minimum depths in the 3D video according to an adjusting signal input through the user interface.

8. The device of claim 5, further comprising a depth video post-processing unit post-processing the obtained depth video of the user,
    wherein the user's position detecting unit detects the user's position based on the post-processed depth video.

9. A terminal including a function for adjusting depth perception, the terminal comprising:
    a color and depth video obtaining unit obtaining color and depth videos of a user;
    a receiving and de-multiplexing unit receiving and de-multiplexing color and depth videos transmitted from the outside;
    a decoding unit decoding the de-multiplexed color and depth videos;

a user's position detecting unit detecting a user's position based on the obtained depth video of the user;

a depth perception adjusting unit calculating a range of maximum and minimum depths in a 3D video according to the detected user's position and adjusting a left and right stereo video generating interval of the 3D video to be rendered so as to satisfy the calculated range of the maximum and minimum depths; and a rendering unit receiving the decoded color and depth videos and rendering the 3D video adjusted according to the left and right stereo video generating interval.

10. The terminal of claim 9, wherein the depth perception adjusting unit scales a depth video of the 3D video according to user input.

11. The terminal of claim 10, wherein the depth perception adjusting unit provides a user interface for scaling the depth video of the 3D video in response to a request signal requesting the scaling of the depth video when the request signal is received from the outside, and decreases or increases a current range of the maximum and minimum depths in the 3D video according to an adjusting signal input through the user interface.

12. The terminal of claim 9, further comprising a depth video post-processing unit post-processing the obtained depth video of the user, wherein the user's position detecting unit detects the user's position based on the post-processed depth video.

13. The terminal of claim 9, further comprising a coding unit coding the color and depth videos of the user obtained by the color and depth video obtaining unit; and a multiplexing and transmitting unit multiplexing and transmitting the coded color and depth videos.

14. A method for operating a terminal including a function for adjusting depth perception, the method comprising:

obtaining color and depth videos of a user;

receiving and de-multiplexing color and depth videos transmitted from the outside;

decoding the de-multiplexed color and depth videos;

detecting a user's position based on the obtained depth video of the user;

calculating a range of maximum and minimum depths in a 3D video according to the detected user's position;

adjusting a left and right stereo video generating interval of the 3D video to be rendered so as to satisfy the calculated range of the maximum and minimum depths; and receiving the decoded color and depth videos and rendering the 3D video adjusted according to the left and right stereo video generating interval.

15. The method of claim 14, further comprising scaling a depth video of the 3D video according to user input.

16. The method of claim 15, wherein the scaling of the depth video of the 3D video includes:

receiving a request signal requesting scaling of the depth video from the outside;

providing a user interface for the scaling the depth video of the 3D video in response to the request signal; and decreasing or increasing a current range of the maximum and minimum depths in the 3D video according to an adjusting signal input through the user interface.

17. The method of claim 14, further comprising post-processing the obtained depth video of the user, wherein the detecting of the user's position includes detecting the user's position based on the post-processed depth video.

18. The method of claim 14, further comprising:

coding the color and depth videos of the user obtained by the color and depth video obtaining unit; and multiplexing and transmitting the coded color and depth videos.

* * * * *